United States Patent
Ho

(10) Patent No.: US 7,362,481 B2
(45) Date of Patent: Apr. 22, 2008

(54) METHOD FOR REDUCING IMAGE ARTIFICIALITY BY ADJUSTING DOT POSITION FOR OVERLAPPED DOTS IN A PRINTER

(75) Inventor: Wen Cheng Ho, Shigang Shiang (TW)

(73) Assignee: Sunplus Technology Co., Ltd., Hsinchu (TW)

( * ) Notice: Subject to any disclaimer, the term of this patent is extended or adjusted under 35 U.S.C. 154(b) by 891 days.

(21) Appl. No.: 10/885,022

(22) Filed: Jul. 7, 2004

(65) Prior Publication Data

US 2005/0073706 A1 Apr. 7, 2005

(30) Foreign Application Priority Data

Oct. 6, 2003 (TW) .............................. 92127658 A

(51) Int. Cl.
    *B41B 15/00* (2006.01)
(52) U.S. Cl. ...................... 358/536; 358/3.06; 358/1.9
(58) Field of Classification Search ................. 358/1.9, 358/3.06, 536; 347/101; 382/254
See application file for complete search history.

(56) References Cited

U.S. PATENT DOCUMENTS 6,088,122 A * 7/2000 Coleman ..................... 358/1.9
6,099,116 A * 8/2000 Fujita et al. ................ 347/101

* cited by examiner

*Primary Examiner*—King Y. Poon
*Assistant Examiner*—Nathan K Tyler
(74) *Attorney, Agent, or Firm*—Bacon & Thomas, PLLC

(57) ABSTRACT

An adjusting dot position method for overlapped dots in a printer is disclosed. The pixels of an image are first input. Then, it determines whether the pixel is an overlapped dot or not. If yes and a pixel on a left side is a blank dot, the magenta, cyan or yellow in the pixel is moved to the left side pixel. Then, it determines whether the pixel is an overlapped dot or not. If yes and a pixel on an upper side is a blank dot, the magenta, cyan or yellow dot in the pixel is moved to the upper side pixel.

6 Claims, 7 Drawing Sheets

METHOD FOR REDUCING IMAGE ARTIFICIALITY BY ADJUSTING DOT POSITION FOR OVERLAPPED DOTS IN A PRINTER

BACKGROUND OF THE INVENTION

1. Field of the Invention

The present invention relates to the technical field of a printer and, more particularly, to an adjusting dot position method for overlapped dots in a printer.

2. Description of Related Art

During a printing process of a conventional printer, due to the low sensitivity of the human eye, when a group of dots are closely arranged within a small area, the human eye cannot distinguish any difference among these dots but sees only an average reflection ratio of this group of dots. Therefore, by controlling the density of this group of dots, different color levels can be generated during the printing process, and typically a dithering method or an error diffusion method is used to determine the density.

However, the dithering method may cause a pattern effect that will result in unpleasant visual sense. Error diffusion can avoid this pattern effect to obtain higher visual qualities. However, mo matter the dithering method or the error diffusion method, the processed data are still comprising the overlapped phenomenon, it will yield unpleasant visual effect after printing the processed data. Therefore, the above conventional printing processes are desired to be improved.

SUMMARY OF THE INVENTION

The objective of the present invention is to provide an adjusting dots position method for overlapped dots in a printer that can reduce large density differences to achieve high quality printing.

To achieve the object, there is provided an adjusting dots position method for overlapped dots in a printer, the printer comprising a memory and three line buffers, an image to be printed being composed of pixels arranged in a two-dimensional array having a plurality of lines, wherein a pixel P(i, j) is in the i-th line and the j-th column, and a pixel P(i, j) is an overlapped dot which has at least two colors of magenta, cyan or yellow. The memory is used for storing the image to be printed. The three line buffers is coupled to the memory and used for temporarily storing three lines of pixels. The method comprises the steps of: (A) inputting the pixels of lines from the memory into the three line buffers; (B) determining whether the pixel P(i, j) in the three line buffers is an overlapped dot; if the pixel P(i, j) is an overlapped dot and a pixel on a left side is a blank dot, the magenta, cyan or yellow in the pixel P(i, j) is moved to the left side pixel in accordance with a first rule; (C) determining whether the pixel P(i, j) in the three line buffers is an overlapped dot; if the pixel P(i, j) is an overlapped dot and a pixel on a upper side is a blank dot, the magenta, cyan or yellow in the pixel P(i, j) is moved to the upper side pixel in accordance with a second rule; (D) outputting the first and the second line buffers; and (E) duplicating content in the third line buffer to the first line buffer and clearing the second and the third line buffers, and executing step (A) again.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
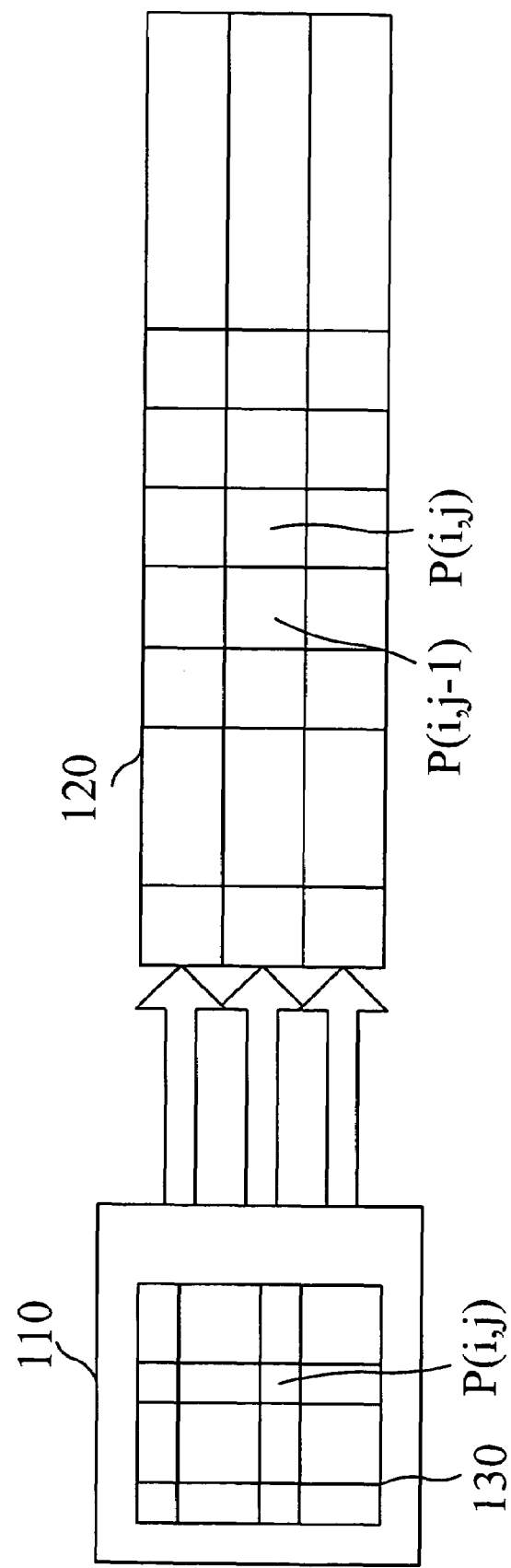
FIG. 1 is a schematic drawing of an adjusting dot position method for overlapped dots in a printer in accordance with the present invention.

FIG. 1 is a schematic diagram of an adjusting dot position method for overlapped dots in a printer in accordance with the present invention. The printer comprises a memory 110 and three line buffers 120. An image 130 to be printed contains a plurality of pixels P(i, j) arranged in a two-dimensional array, wherein a pixel P(i, j) is in the i-th line and the j-th column. A pixel P(i, j) is said to be an overlapped dot when it has at least two colors of magenta, cyan or yellow. The memory 110 is used for storing the image 130 to be printed, and the three line buffers 120 are coupled to the memory and are used for temporarily storing three lines of pixels of the image 130.

Figure 2A:
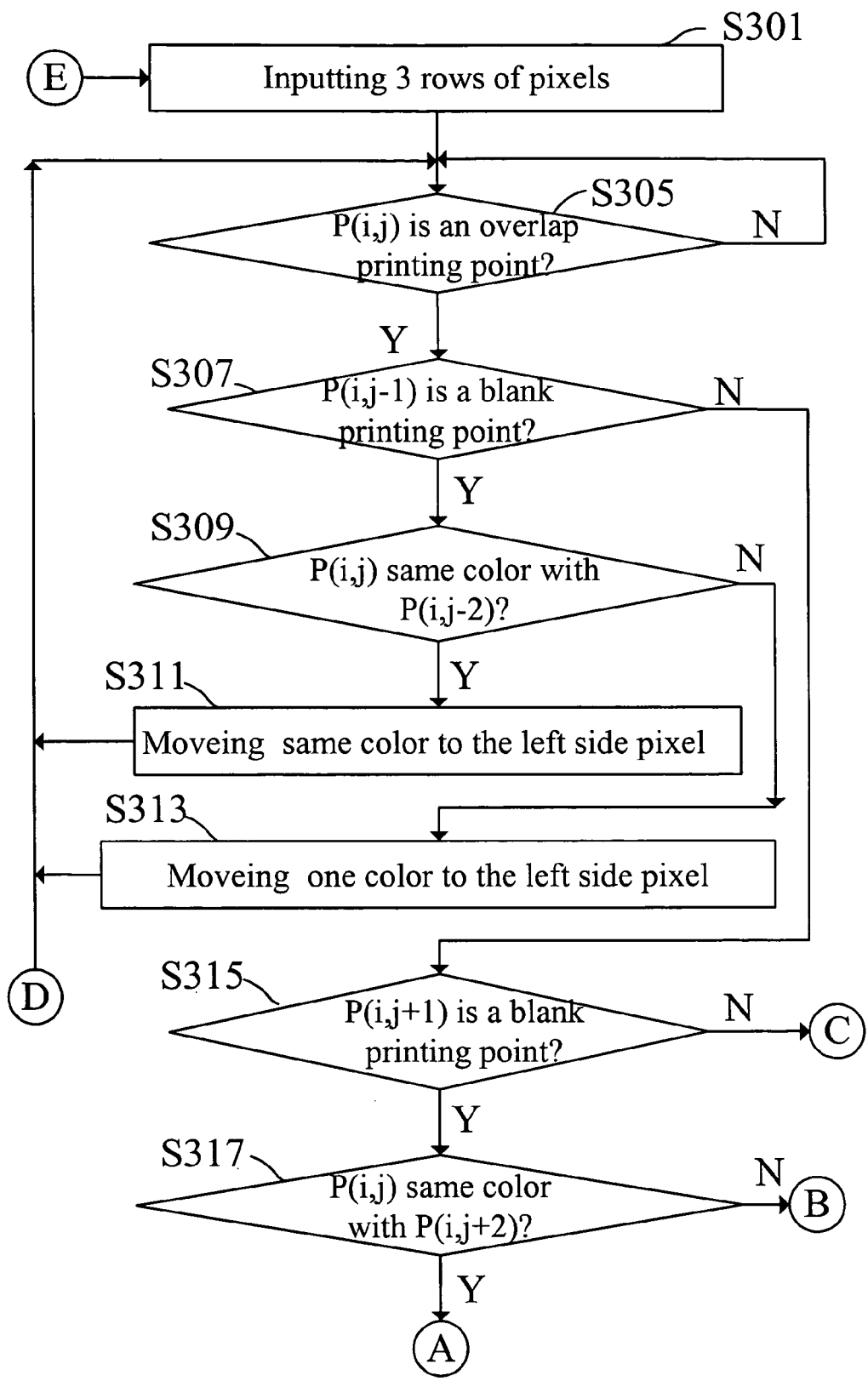
FIG. 2A and FIG. 2B are flowchart of the adjusting dot position method for overlapped dots in a printer in accordance with the present invention.
Figure 2B:
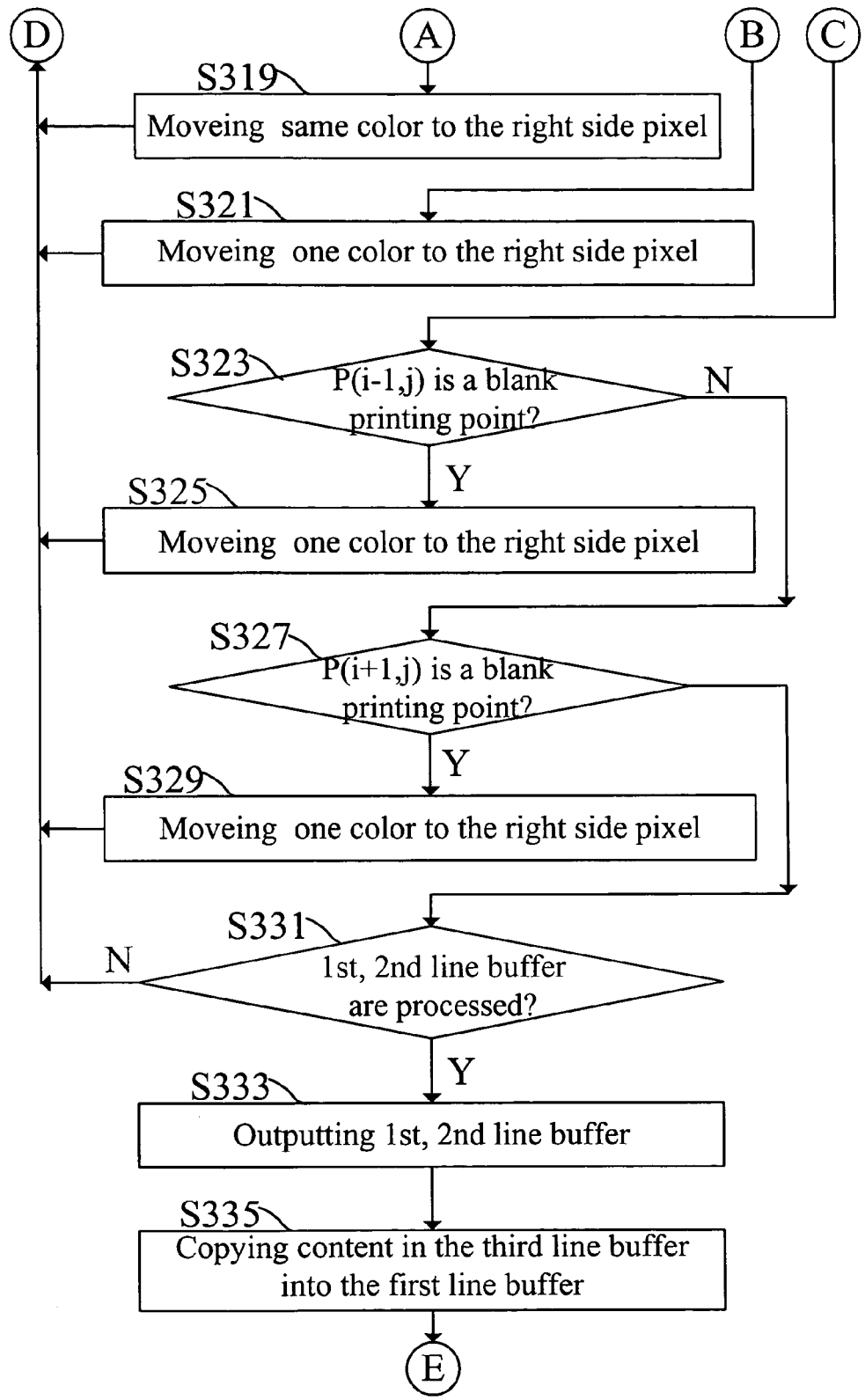

FIG. 2A and FIG. 2B are flowchart of the adjusting dot position method for overlapped dots in a printer in accordance with the present invention. First, in step 301, column pixels are input from the memory 110 and loaded into the three line buffers 120.

In step 305, it is determined whether the pixel P(i, j) in the three line buffers is an overlapped dot. If yes, step 307 is performed to further determine whether a pixel P(i, j−1) on the left side of pixel P(i, j) is a blank dot. If not, step 315 is performed. If the left side pixel P(i, j−1) is a blank dot, step 309 is performed.

Figure 3:
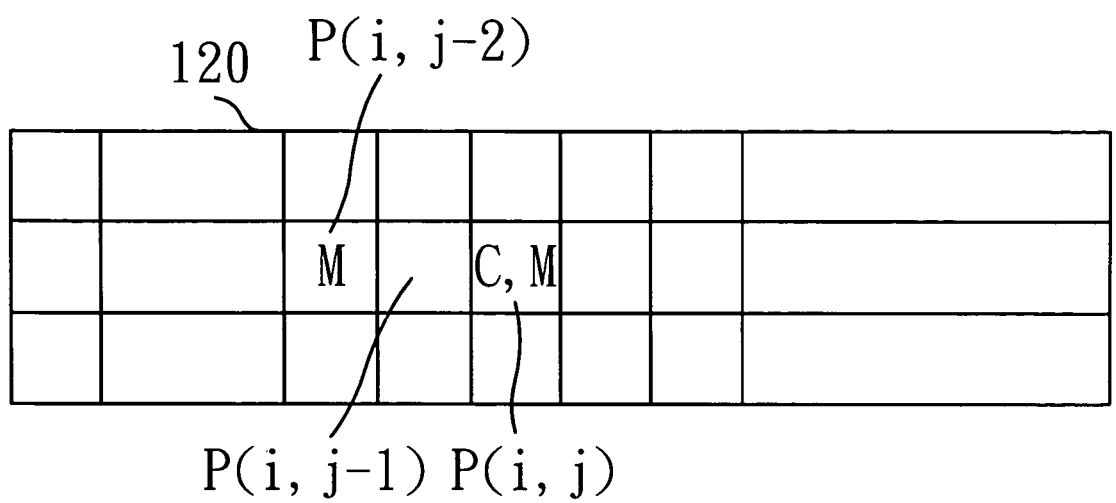
FIG. 3 to FIG. 6 are the schematic diagrams of respectively adjusting dot position of a pixel P(i, j) in accordance with the present invention.
Figure 3:
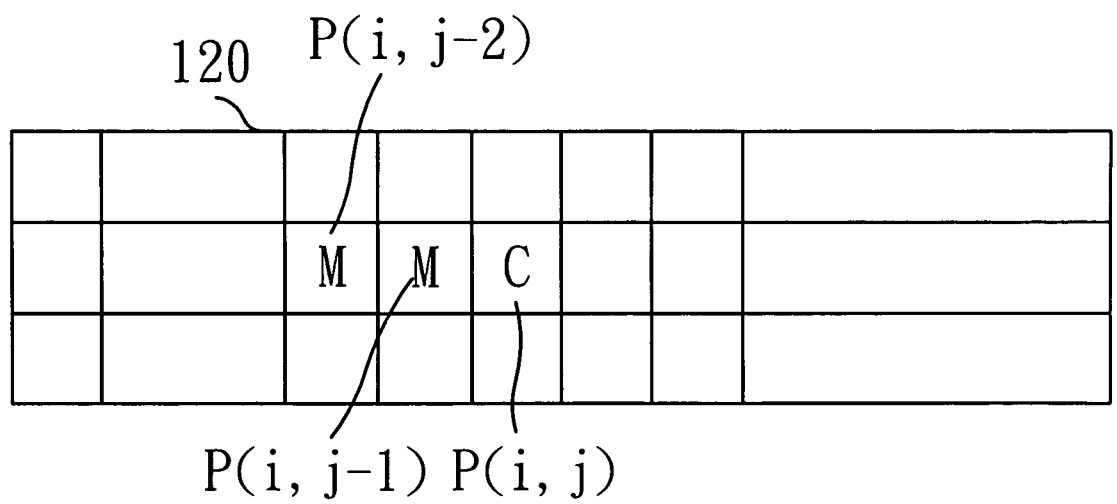

In step 309, it is determined whether the pixel P(i, j) and a second left pixel P(i, j−2) have the same color. If yes, step 311 is performed, which moves the same color in the pixel P(i, j) to the left side pixel P(i, j−1), and then step 305 is executed. As shown in FIG. 3, the pixel P(i, j) is an overlapped dot with magenta and cyan and the pixel P(i, j−1) is a blank dot. Because the second left pixel P(i, j−2) is a magenta dot, the magenta dot in the pixel P(i, j) is moved into the pixel P(i, j−1), which satisfies a gray level requirement in the error diffusion method. Furthermore, there will be no sudden color changes among these three pixels that would otherwise reduce the printing image quality.

In step 309, if the pixel P(i, j) and the second left pixel P(i, j−2) do not have the same color, step 313 is performed. In step 313, one color in the pixel P(i, j) is moved into the pixel P(i, j−1) in accordance with a prioritized ranking from cyan to magenta to yellow, and then the process returns to step 305.

In step 315, it determines whether a pixel P(i, j+1) on the right side of the pixel P(i, j) is a blank dot. If not, step 323 is performed. If yes, step 317 is performed.

Figure 4:
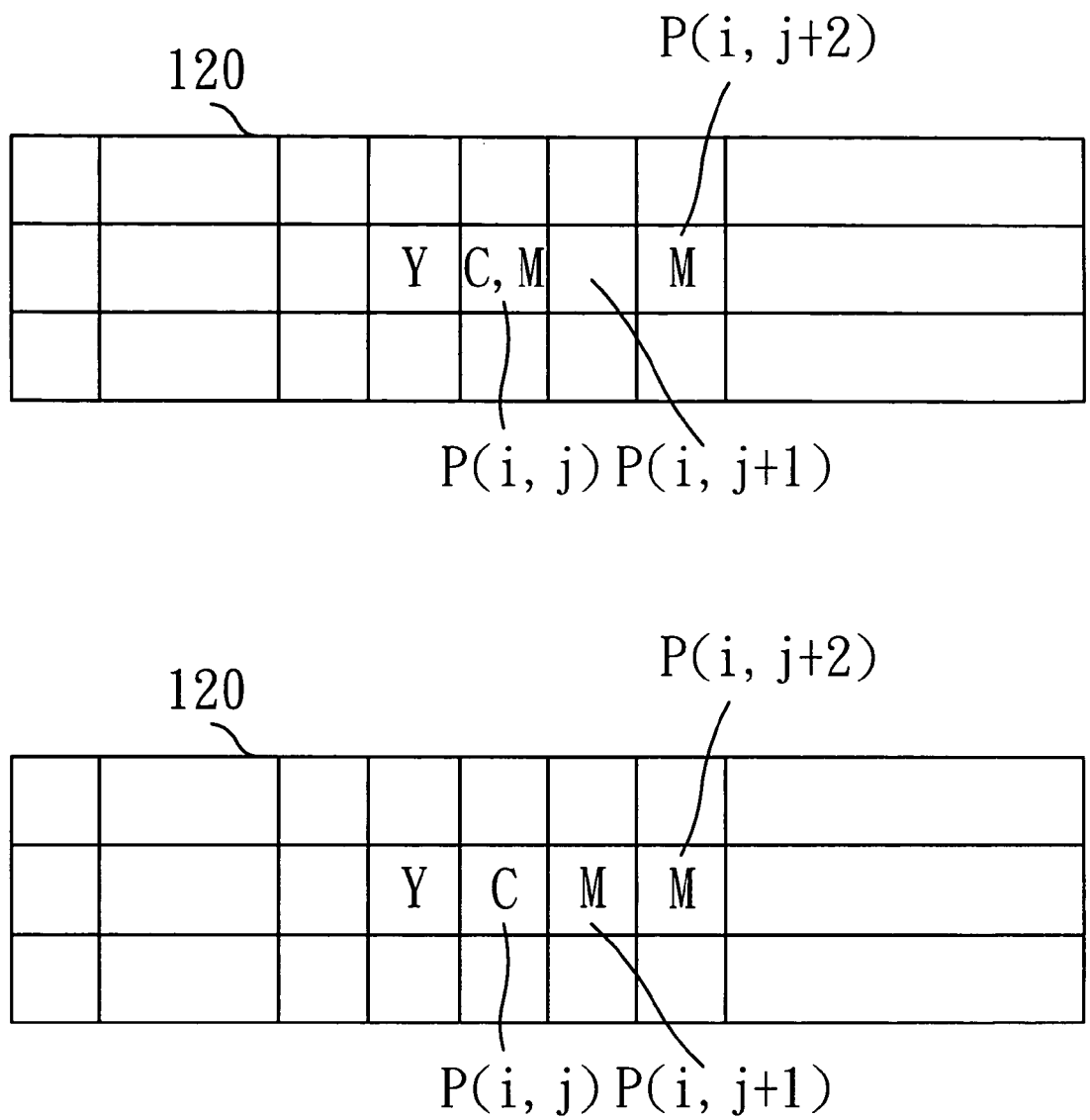

In step 317, it determines whether the second right pixel P(i, j+2) and the pixel P(i, j) have the same color or not. If yes, step 319 is performed, which moves the same color in the pixel P(i, j) to the right side pixel P(i, j+1), and then step 305 is executed. As shown in FIG. 4, the pixel P(i, j) is an overlapped point with magenta and cyan, the pixel P(i, j−1) is not a blank dot, the pixel P(i, j+1) is a blank dot and the second right pixel P(i, j+2) is a magenta dot. The magenta in the pixel P(i, j) is moved into the pixel P(i, j+1), which satisfies a gray level requirement in the error difflusion method. Furthermore, there are no sudden color changes among these three pixels that would otherwise reduce the printing image quality.

In step 317, if the pixel P(i, j) and the second right pixel P(i, j+2) do not have the same color, step 321 is performed. In step 321, one color in the pixel P(i, j) is moved into the pixel P(i, j+1) in accordance with a prioritized ranking from cyan to magenta to yellow, and then the process returns to step 305.

Figure 5:
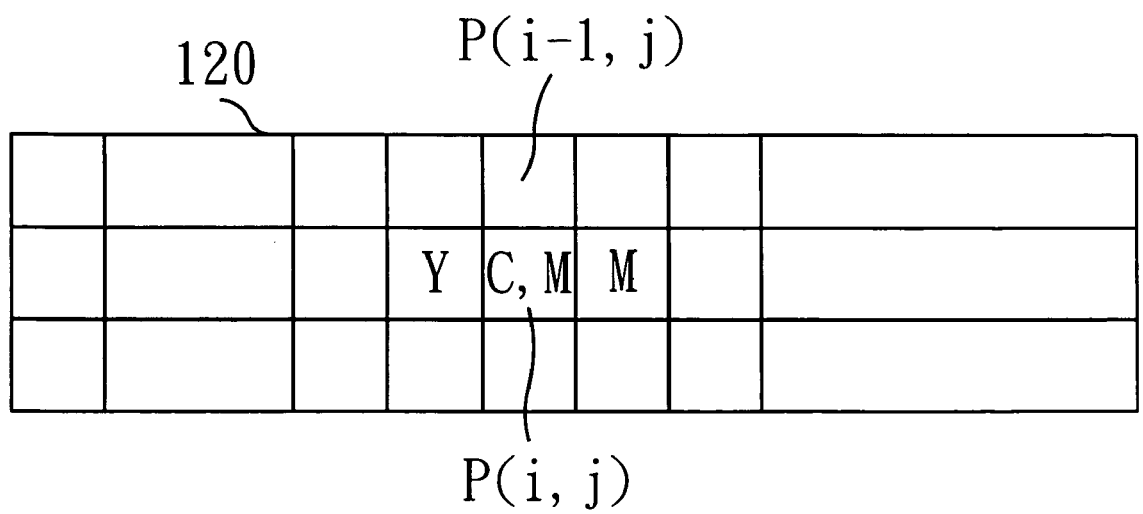
Figure 5:
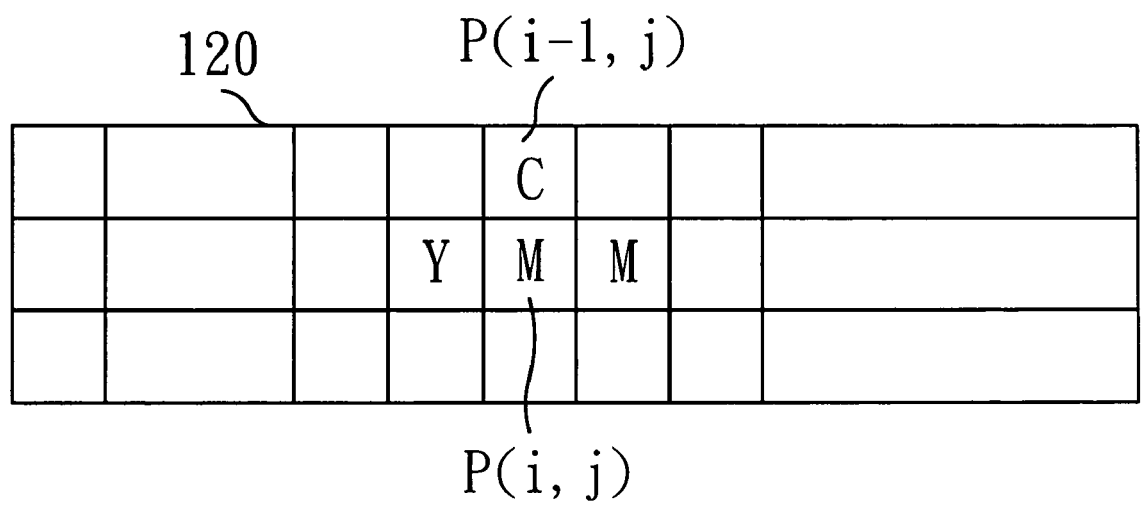

In step 323, it determines whether a pixel P(i−1, j) above the pixel P(i, j) is a blank dot or not. If not, step 327 is performed. If yes, step 325 is performed. In step 325, one color in the pixel P(i, j) is moved into the pixel P(i−1, j) in accordance with a prioritized ranking from cyan to magenta to yellow, and then the process returns to step 305. As shown in FIG. 5, the pixel P(i, j) is an overlapped dot with magenta and cyan, the pixel P(i−1, j) is a blank dot, the pixel P(i, j+1) and the pixel P(i, j−1) are not blank dot, and the cyan in the pixel P(i, j) is moved into the pixel P(i−1, j).

Figure 6:
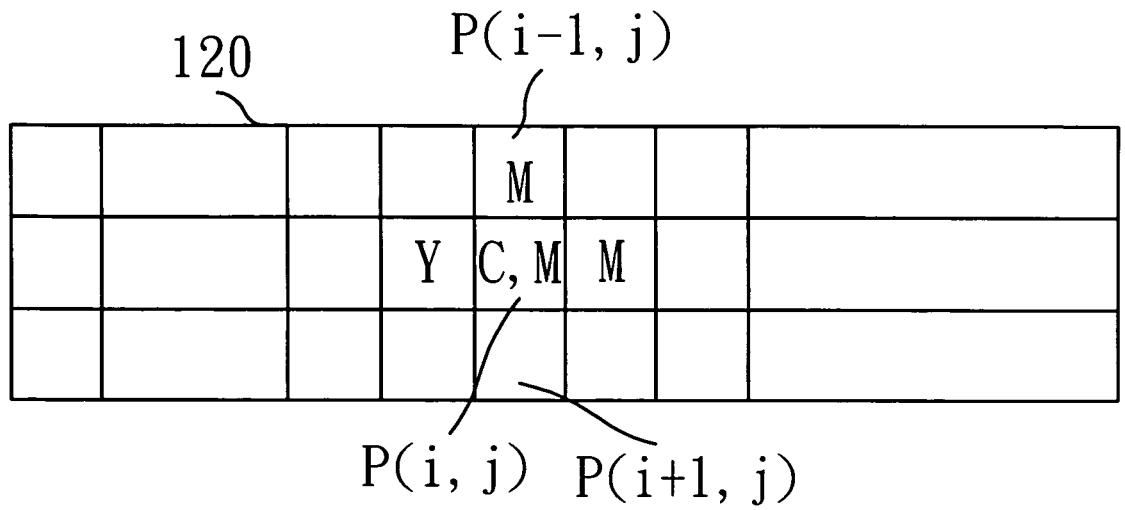
Figure 6:
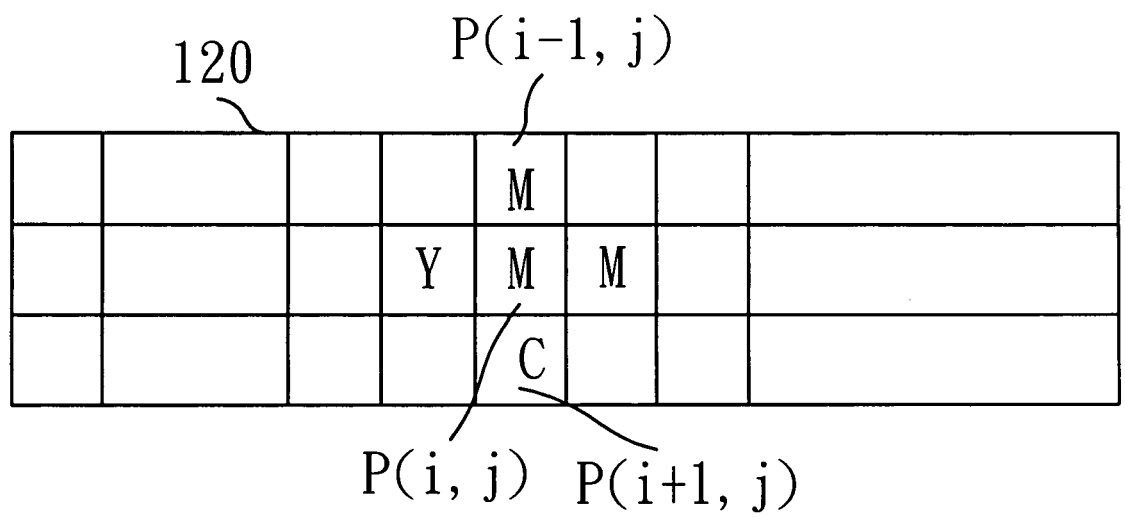

In step 327, it determines whether a pixel P(i+1, j) below the pixel P(i, j) is a blank dot or not. If not, it means that there is no blank pixel next to the pixel P(i, j) so that there is no color adjustment that can be performed, and then step 331 is performed. If the pixel P(i+1, j) is a blank dot, step 329 is performed. In step 329, one color in the pixel P(i, j) is moved into the pixel P(i+1, j) in accordance with a prioritized ranking from cyan to magenta to yellow, and then the process returns to step 305. As shown in FIG. 6, the pixel P(i, j) is an overlapped dot with magenta and cyan, the pixel P(i+1, j) is a blank dot, the pixel P(i−1, j), the pixel P(i, j+1) and the pixel P(i, j−1) are not blank dot, and the cyan in the pixel P(i, j) is moved into the pixel P(i+1, j).

In step 331, it determines whether the pixels P(i, j) in the first line buffer and the second line buffer have all been processed. If any pixels P(i, j) have not been processed, step 305 is performed again. If all pixels P(i, j) in the first line buffer and the second line buffer have been processed, step 333 is performed. In step 333, the processed first line buffer and the second line buffer are output. In step 335, content in the third line buffer is duplicated into the first line buffer, the second and the third line buffers are emptied, and then step 305 is performed again.

In viewing of foregoing, it is known that the adjusting dot position method for overlapped dots in accordance with the present invention can achieve better printing qualities and avoid mixing of different colors, which would otherwise cause printing color mistakes and incorrect ink point shapes. The present invention also prevents one dot from being printed with another dot, or near an area with a significant different density.

Although the present invention has been explained in relation to its preferred embodiment, it is to be understood that many other possible modifications and variations can be made without departing from the spirit and scope of the invention as hereinafter claimed.

What is claimed is:

1. An adjusting dot position method for overlapped dots in a printer, the printer comprising a memory and three line buffers, an image to be printed being composed of pixels arranged in a two-dimensional array, wherein a pixel P(i, j) is in the i-th line and the j-th column, and a pixel P(i, j) is an overlapped dot which has at least two colors of magenta, cyan or yellow, the memory being used for storing the image to be printed, the three line buffers being coupled to the memory and used for temporarily storing three lines of pixels, the method comprising the steps of:
   (A) inputting the pixels of lines from the memory into the three line buffers;
   (B) determining whether the pixel P(i, j) in the three line buffers is an overlapped dot; if the pixel P(i, j) is an overlapped dot and a pixel on a left side is a blank dot, the magenta, cyan or yellow in the pixel P(i, j) is moved to the left side pixel in accordance with a predetermined first rule;
   (C) determining whether the pixel P(i, j) in the three line buffers is an overlapped dot; if the pixel P(i, j) is an overlapped dot and a pixel on a upper side is a blank dot, the magenta, cyan or yellow in the pixel P(i, j) is moved to the upper side pixel in accordance with a predetermined second rule;
   (D) outputting the first and the second line buffers; and
   (E) duplicating content in the third line buffer to the first line buffer and clearing the second and the third line buffers, and executing step (A) again.

2. The method as claimed in claim 1, wherein in step (B), the first rule comprises the steps of:
   (B1) determining whether a second left pixel from the pixel P(i, j) and the pixel P(i, j) have the same color or not;
   (B2) moving the same color in the pixel P(i, j) to the left side pixel if step (B1) is determined to have the same color; and
   (B3) moving one color in the pixel P(i, j) in accordance with a prioritized ranking from cyan to magenta to yellow, to the left side pixel if step (B1) is determined to have different colors.

3. The method as claimed in claim 1, wherein in step (B), if the pixel P(i, j) is an overlapped dot but the left side pixel is not a blank dot and a right side pixel is a blank dot, the magenta, cyan or yellow in the pixel P(i, j) is moved to the right side pixel in accordance with a predetermined third rule.

4. The method as claimed in claim 3, wherein the third rule comprises the steps of:
   (B4) determining whether a second right pixel from the pixel P(i, j) and the pixel P(i, j) have the same color;
   (B5) moving the same color in the pixel P(i, j) to the right side pixel if step (B4) is determined to have the same color; and
   (B6) moving one color in the pixel P(i, j) in accordance with a prioritized ranking from cyan to magenta to yellow, to the right side pixel if step (B4) is determined to have different colors.

5. The method as claimed in claim 1, wherein in step (C), the second rule comprises the steps of:
   (C1) moving one color in the pixel P(i, j) in accordance with a prioritized ranking from cyan to magenta to yellow, to an upper side pixel.

6. The method as claimed in claim 5, wherein in step (C), if the pixel P(i, j) is an overlapped dot but the upper side pixel of the pixel P(i, j) is not a blank dot and a lower side pixel is a blank dot, one color in the pixel P(i, j) is moved in accordance with a prioritized ranking from cyan to magenta to yellow, to the lower side pixel.

* * * * *